(12) United States Patent
Moore

(10) Patent No.: US 6,440,521 B1
(45) Date of Patent: Aug. 27, 2002

(54) METHOD FOR TRANSFERRING HEAT IN AN AIRCRAFT ENGINE THRUST REVERSER

(75) Inventor: Francis W. Moore, Seattle, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/703,358

(22) Filed: Oct. 31, 2000

Related U.S. Application Data

(62) Division of application No. 09/111,834, filed on Jul. 28, 1995, now Pat. No. 6,210,773, which is a continuation of application No. 07/926,444, filed on Aug. 10, 1992, now abandoned.

(51) Int. Cl.$^7$ .................................................. F01P 1/02
(52) U.S. Cl. ..................... 428/73; 428/116; 428/408; 428/131; 428/367; 123/41.7; 244/53 R; 244/110 B; 165/58; 423/447.1; 423/445 R
(58) Field of Search ..................... 428/116, 73, 408, 428/131, 367; 165/58; 244/1 R, 53 R, 110 B; 123/41.7, 41.56, 41.01; 423/445 R, 447.1, 447.2

(56) References Cited

U.S. PATENT DOCUMENTS

| 4,052,523 A | 10/1977 | Rhodes et al. |
| 4,235,303 A | 11/1980 | Dhoore et al. |
| 4,249,974 A | 2/1981 | Wilson |
| 4,257,998 A | 3/1981 | Diepenbrock, Jr. et al. |
| 4,265,955 A | 5/1981 | Harp et al. |
| 4,421,201 A | 12/1983 | Nelsen et al. |
| 4,495,764 A | 1/1985 | Gnagy |
| 4,533,098 A | 8/1985 | Bonini et al. |
| 4,539,244 A | 9/1985 | Beggs et al. |
| 4,578,303 A | 3/1986 | Kundinger et al. |
| 4,600,619 A | 7/1986 | Chee et al. |
| 4,618,463 A | 10/1986 | Uemura et al. |
| 4,833,029 A | 5/1989 | DuPont et al. |
| 5,498,462 A | 3/1996 | Darfler |

FOREIGN PATENT DOCUMENTS

| DE | 3625534 | 2/1988 |
| EP | 8593932 | 1/1984 |
| EP | 8804707 | 6/1988 |
| GB | 2019983 | 1/1979 |
| JP | 4053736 | 2/1992 |

Primary Examiner—Deborah Jones
Assistant Examiner—Wendy Boss
(74) Attorney, Agent, or Firm—John C. Hammar

(57) ABSTRACT

Thrust reverser inner wall structure comprising a thermally conductive nonmetallic carbon pitch fiber honeycomb core sandwiched between a top and bottom layer. The core is adhered by a reticulated layer of adhesive to a perforated carbon fiber top layer, and adhered to a base layer of nonmetallic, nonperforated carbon fiber reinforced fabric.

3 Claims, 1 Drawing Sheet

METHOD FOR TRANSFERRING HEAT IN AN AIRCRAFT ENGINE THRUST REVERSER

The present application is a divisional application based upon U.S. patent application Ser. No. 09/111,834, filed Jul. 28, 1995, now U.S. Pat. No. 6,210,773, which was a continuation application based upon U.S. patent application Ser. No. 07/926,444, filed Aug. 10, 1992, now abandoned.

BACKGROUND OF THE INVENTION

A typical commercial airplane gas turbine engine includes a thrust reverser cowling nacelle. The nacelle structure consists of an inner and outer cowl joined with bifurcations. The engine fan airstream runs through the annular cavity between the two cowls. The inner cowl or wall covers the engine case, accessories, and ducting installed therein. Because the engine case is very hot, up to 1100 degrees F., the inside surface of the inner cowl, referred to as the thrust reverser inner wall, is exposed to high radiative energy.

Thrust reverser inner wall structures have generally been made with aluminum skin, an aluminum honeycomb core, and a layer of applied insulation on the hot surface adjacent to the engine case. This metallic thrust reverser inner wall has been effective in conducting heat away from the engine to the surface adjacent to the fan airstream. A metallic structure is heavy, resulting in a significant weight penalty. In addition, the aluminum is susceptible to corrosion damage.

To reduce the weight penalties and improve acoustic characteristics, the thrust reverser inner wall has been built with an aluminum honeycomb core sandwiched between carbon fiber layers. As a result of the carbon fibers adjacent to the aluminum core, the wall structure has been susceptible to galvanic corrosion, particularly in the presence of moisture. Such corrosion creates a potential for subsequent structural failure of the aluminum core that is not acceptable.

SUMMARY OF THE INVENTION

Accordingly, the present invention provides a thrust reverser inner wall structure that substantially reduces the weight penalty realized, avoids susceptibility to corrosion, maintains the strength of the wall, and maintains adequate thermal conductivity, thereby reducing the need for insulation.

In accordance with the subject invention, a thrust reverser wall is a sandwich structure with a top layer of epoxy impregnated perforated carbon fiber fabric, a non-metallic, composite honeycomb core, and a bottom layer of epoxy impregnated carbon fiber fabric without perforations.

The non-metallic honeycomb core is made with pitch (based) carbon fibers to achieve the necessary thermal conductivity. The wall's high level of thermal conductivity is such that the engine heat is conveyed to the perforated carbon fiber top layer. Engine fan air passing over the top layer acts as a heat sink wherein enough heat is carried away from the engine to minimize the need for insulation on the engine side of the wall.

These advantages of the present invention will be more clearly understood from the detailed description of the preferred embodiment that follows taken in conjunction with the features shown in the attached drawings.

DETAILED DESCRIPTION OF THE PREFERRED EMBODIMENT

Figure 1:
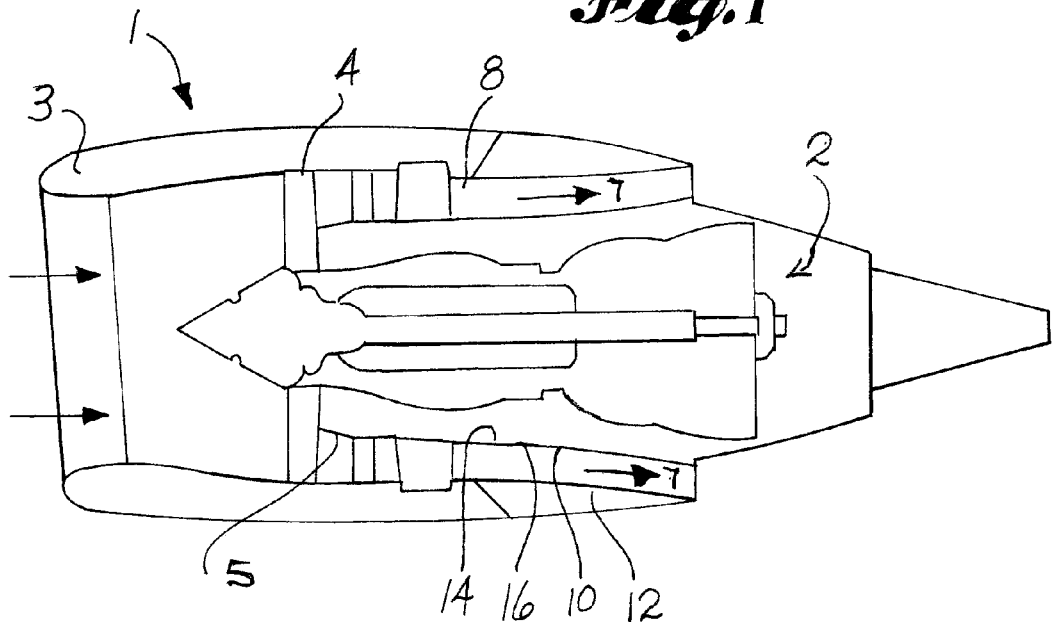
FIG. 1 is a cross section of a typical commercial aircraft jet power plant.

As seen in FIG. 1, a typical commercial aircraft jet power plant 1 comprises the engine 2, associated cowling 3, fan 4, and thrust reverser cowling 5. The fan 4 draws air through the power plant 1 as indicated by the fan air flow arrows 7. The fan air flow (7) enters cowling 3 and passes through the annular fan air bypass duct 8 between the thrust reverser inner wall 10 and the thrust reverser outer wall 12.

While the power plant 1 is operating, the engine 2 generates a substantial amount of heat and reaches up to 1100 degrees F. The inside surface 14 of the thrust reverser inner wall 10 is directly exposed to the high radiative energy. To reduce the need for insulation (not shown) on the inside surface 14, the subject thrust reverser inner wall 10 is designed to conduct the heat away from the engine 2, through the thrust reverser inner wall 10 to the relatively cold outer surface 16 Of the thrust reverser inner wall 10. The cold fan air flow 7 passing over the outer surface 16 acts as a heat sink. As such, high thermal conductivity of thrust reverser inner wall 10 results in less insulation and smaller weight penalties.

Weight penalties associated with the thrust reverser inner wall 10 are also substantially reduced by utilizing composite materials for the honeycomb core rather than aluminum or other metals. The thrust reverser inner wall 10 of the subject invention, as described below, maintains high thermal conductivity while utilizing all non-metallic components.

Figure 2:
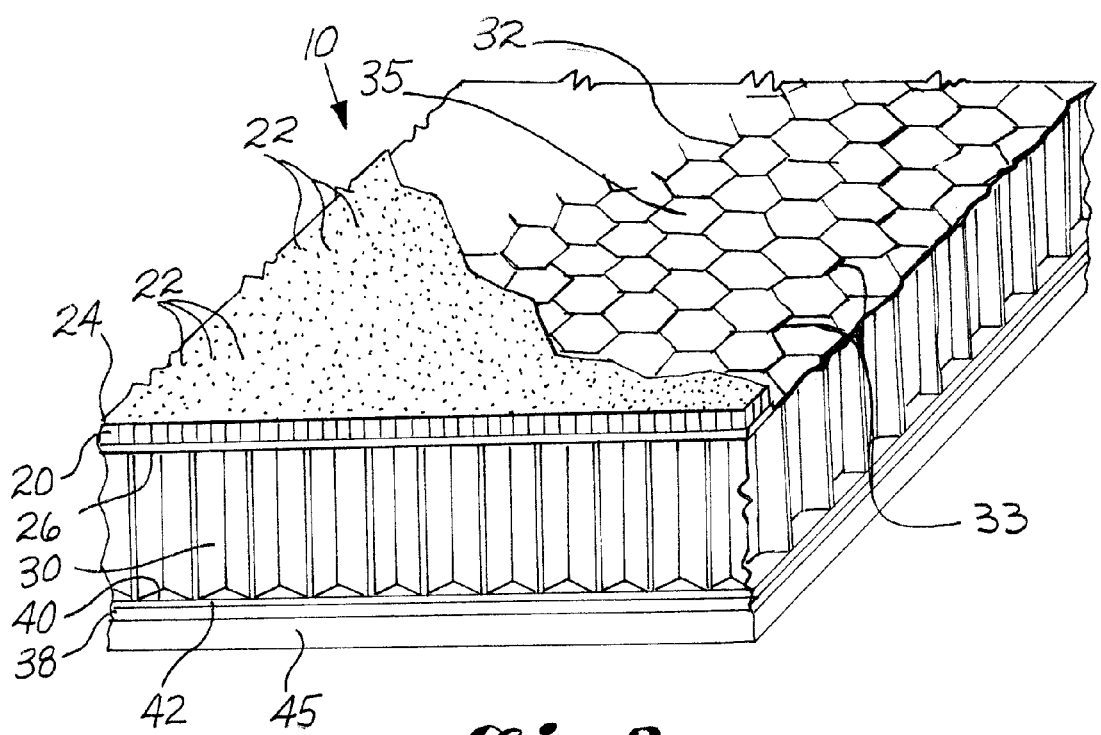
FIG. 2 is an isometric cut away view of the subject non-metallic thrust reverser inner wall.

As seen in FIG. 2, thrust reverser inner wall 10 is a sandwich structure with a top layer 20 of perforated carbon fiber reinforced epoxy. Perforations 22 are manufactured into the top layer 20 when the layer is partially cured on a perforation layup tool (not shown). The perforations 22 are designed to maintain proper acoustic properties of the thrust reverser inner wall 10. When installed in the power plant 1, the top face 24 of perforated carbon fiber top layer 20 directly interfaces with the fan air flow 7.

A layer of reticulated adhesive 26 adheres the perforated carbon fiber top layer 20 to a thermally conductive non-metallic carbon pitch fiber honeycomb core 30. In the preferred embodiment, adhesive layer 26 comprises BMS 5-137 Structural Adhesive for Acoustic Panels as defined in The Boeing Company specification BAC 5514-5137.

Thermally conductive non-metallic impregnated carbon pitch fiber honeycomb core 30 consists of impregnated fabric reinforced sheets 32, corrugated to form specific honeycomb cells 35, then bonded with a polyimide adhesive resin and coated with a polyimide resin in accordance with The Boeing Company specification BMS 8–339. The carbon pitch fiber honeycomb core 30 has thermal conductivity ranging from 1.09–2.05 W/m–K, and, preferably, from 1.9 to 2.05 W/mxdegrees K. This thermal conductivity characteristic transmits sufficient heat to be removed by fan airflow 7, thereby reducing the weight penalty associated with a resulting thick insulation layer.

The carbon pitch fiber honeycomb core 30 in the preferred embodiment, as specified in The Boeing Company specification BMS 8-339, is manufactured by Hexcel Corporation, Graham, Tex., as part numbers HFT-GP-327. Compared to an aluminum honeycomb core, the Hexcel carbon pitch fiber honeycomb core 30 material reduces the weight penalty by 26% and is not susceptible to corrosion.

A base layer 38 of non-metallic, nonperforated carbon fiber reinforced fabric is adhered to the bottom surface 40 of carbon pitch fiber honeycomb core 30 by a layer of adhesive 42. In the preferred embodiment, the adhesive used is BMS 8-245 Adhesive for Composite Bonding, as defined by The Boeing Company specification BMS 8-245.

The thrust reverser inner wall 10 sandwich structure described above is fabricated in accordance with The Boeing Company specification BAC 5317-6.

The preferred embodiment of the thrust reverser inner wall 10 has an insulation layer 45 adhered to the bottom of base layer 38, wherein the insulation layer is the layer adjacent and closest to the engine 2 when installed in the power plant.

While a particular embodiment of the invention has been described, it will be apparent to persons skilled in the art to which this invention pertains that many modifications and variations thereto are possible without departing from the spirit and scope of the invention.

Accordingly, the scope of this invention should be considered limited only by the spirit and scope of the elements of the appended claims or their reasonable equivalents.

I claim:

1. In an aircraft power plant, a method for conducting heat through a thrust reverser inner wall made from a honeycomb core sandwich panel, comprising the steps of:

(a) conducting heat from a carbon-fiber reinforced resin composite face sheet of the inner wall to a carbon fiber honeycomb core, the core having oriented carbon pitch fibers and a thermal conductivity of about 1.09–2.05W/ m–°K; and (b) conducting heat from the core to a perforated, fiber reinforced resin composite face sheet in contact with fan airflow for the aircraft power plant.

2. A method for transferring heat from an aircraft engine to engine fan air in an engine nacelle, comprising the steps of:

(a) orienting pitch based carbon fibers in a thrust reverser inner wall positioned between the engine and the fan air;

(b) conducting heat from the engine to the fan air through the fibers to a perforated carbon fiber top layer; and (c) transferring heat from the top layer to the air passing over the top layer.

3. A method for reducing weight in a thrust reverser inner wall for an aircraft engine, comprising the step of:

reducing the volume of insulation for the inner wall by using pitch based carbon fibers in a honeycomb core of the wall rather than aluminum honeycomb to conduct heat from the engine to engine fan air to cool the wall and the engine.

\* \* \* \* \*